Patented Aug. 11, 1942

2,292,516

UNITED STATES PATENT OFFICE 2,292,516

METHOD OF MOLDING PLASTIC

Walter E. Gloor, Milltown, N. J., assignor to Hercules Powder Company, Wilmington, Del., a corporation of Delaware No Drawing. Application June 27, 1940, Serial No. 342,702

13 Claims. (Cl. 18—55)

This invention relates to a method for molding cellulose acetate, and more particularly relates to a method of producing molded articles of uniform structure from compositions based upon high acetyl type of cellulose acetate.

Cellulose acetate plastics utilized for molding at the present time consist of about ⅔ cellulose acetate and about ⅓ plasticizing material. The cellulose acetate has a degree of acetylation between about 52% and about 56% (in most cases 52–54%) calculated as acetic acid. Such plastics are useful for many purposes but they are not entirely satisfactory because they are sensitive to water.

The use of cellulose acetate having a somewhat higher acetyl content has been proposed from time to time, for example, cellulose acetate approaching the triacetate type, i. e., from 59 to 62.5% acetic acid content has been proposed as the base of films and plastic articles which are stable even when submerged a long time in water. Again plastics based upon the use of cellulose acetate having a combined acetic content in the range from about 56 to about 58.5% have been proposed for improving the stability of molded articles subjected to moist conditions. However, these proposals have failed to influence the art appreciably because plastics prepared from these higher acetyl types of cellulose acetate have been too brittle to find any appreciable use. In all cases impact strength of plastics of this nature has been very low and it has been though that brittleness or low impact strength was an unfortunate characteristic property of high acetyl cellulose acetate compositions.

It has now been found after long research that the belief that high acetyl compositions were inherently brittle as compared with lower acetyl material is not scientifically sound. Methods of molding heretofore utilized with complete success for lower acetyl materials have given molded articles of high acetyl cellulose acetate of apparently good appearance but yet of low impact strength. It has now been found that these moldings have a very non-uniform, inhomogeneous internal physical structure characterized by inability to distribute external stresses in a manner to achieve resilience.

It is an object of this invention to utilize the advantages of high acetyl cellulose acetate in plastics by providing a method of molding such plastics which leads to tough molded articles having a high impact strength.

It is a further object to provide a method of molding which will produce moldings from compositions based upon high acetyl cellulose acetate having a substantially homogeneous physical structure.

It is a still further object to provide a method of molding high acetyl cellulose acetate compositions to molded articles characterized by uniformity of the structure as shown by simple strain lines in polarized light.

It is a still further object to provide a method of molding for high acetyl cellulose acetate compositions which will produce moldings characterized by a smooth surface having good gloss. These and further objects will become apparent as this invention is described.

These objects are attained in accordance with this invention by the method which includes heating a composition comprising as an essential ingredient cellulose acetate having a combined acetic acid content between about 56.5% and about 61% as acetic acid, the remainder being plasticizing ingredients, other modifiers, fillers, etc. to a temperature in the range between about 380° F. and about 450° F., preferably between 410 and 430° F., and applying pressure to the cellulose acetate composition while it is at the said temperature and in a suitable mold, whereby a molded article of substantially uniform internal structure is obtained. The material shaped in this manner is then allowed to cool or is cooled by the mold until it reaches a state of rigidity in which it is at least self-supporting, whereupon it is removed from the mold.

A suitable procedure in accordance with this invention comprises introducing a suitably granulated or powdered molding composition into a heating cylinder where it is heated to a temperature in the range hereinabove mentioned. The heated composition attains a fluid state whereupon it is injected by pressure which is desirably in excess of about 200 lbs./sq. in. into a mold adapted to shape it as desired. The material in the mold is then cooled (or permitted to cool) with or without the aid of a cooling fluid in jackets of the mold, until it attains sufficient rigidity to be removed without distortion from the mold. It is then removed from the mold. Equipment suitable for use in applying the method in accordance with this invention is well known in the molding art. Injection molding presses of the known types may be utilized. However, the equipment utilized should be provided with heating means capable of introducing heat rapidly and at a temperature higher than is normally utilized so that the composition molded may rapidly attain the high temperatures required by the method of this invention. It will be appreciated that other types of equipment and other procedures, such as those in which material is preheated in the mold, may be used if desired, provided a composition of the character described is treated as specified.

Molded articles of high acetyl cellulose acetate compositions prepared according to the method of this invention are characterized by a very uniform internal physical structure substantially free of internal stresses and able to distribute external stresses throughout the molding in a manner to achieve resilience and a high impact strength. The molding is characterized by a very simple strain line arrangement upon viewing a piece of transparent molded material placed between extinguishing light polarizing mediums such as crossed nicol prisms, polaroid sheets, etc. The transparent molding so viewed is seen as a substantially uniform field with simple strain lines and upon rotating one polarizer with respect to the other the field grows lighter and darker again as the extinction angle is drawn away from and approached. This physical characteristic of the articles molded in accordance with the method of this invention is distinguished from the properties of previous high acetyl molded articles which have a non-uniform structure. Previous articles placed between extinguishing light polarizing mediums such as those mentioned will give a bright field with many granular multi-colored spots when viewed with crossed nicol prisms and upon rotating one of the prisms, there will be little change in color or brightness of field.

Articles molded by the method in accordance with this invention are characterized by both hardness and high impact strength. Hardness will be in excess of 20 on the Rockwell M scale, yet impact strength will be more than 1.8 ft. lbs./sq. inch of the Charpy method.

At the pressure employed, the high temperatures utilized in the method of this invention surprisingly enough cause no serious degradation of the cellulose acetate. The high temperatures utilized have been avoided as likely to cause discoloration, degradation, or decomposition.

The method in accordance with this invention is a method of molding compositions having as their base or essential ingredient a cellulose acetate with a combined acetic acid content of from about 56.5% to about 61% as acetic acid, especially from 56.5% to 58%. The composition will comprise between about 66 and about 75% of the said cellulose acetate and the remainder of the composition will consist of placticizing material, fillers, and coloring matter, molding lubricants, etc. The plasticizing material may consist of one or more substances at least one of which will have the property of colloiding the cellulose acetate and lowering the softening point thereof. The plasticizing material or mixture utilized will be compatible with the cellulose acetate and will be substantially non-volatile in nature. Typical examples of the composition which may be molded by the method in accordance with this invention are given in the table. All parts and percentages herein and in the claims are by weight.

TABLE

*Typical molding compositions molded by method herein described*

| | Example | | | | | |
|---|---|---|---|---|---|---|
| | I | II | III | IV | V | VI |
| Cellulose acetate (58.1% acetic acid) | 70 | | | | | |
| Cellulose acetate (57.9% acetic acid) | | 70 | | | | |
| Cellulose acetate (57.6% acetic acid) | | | 72 | | | 69 |
| Cellulose acetate (60.9% acetic acid) | | | | 72 | 66 | |
| Dimethyl phthalate | | 10 | 18.6 | 28 | 34 | 12.4 |
| Diethyl phthalate | 20 | | | | | 12.4 |
| Phthalate of mixture of methanol and methoxyethanol | 5 | 9 | 4.7 | | | |
| Methyl phthallyl ethyl glycollate | | 11 | | | | |
| Triphenyl phosphate | 5 | | 4.7 | | | 6.2 |
| Optimum molding temperature, °F | 425 | 425 | 425 | 450 | 425 | 400 |

The compositions gave articles of high strength when molded at the temperatures indicated but gave brittle weak articles when molded at temperatures heretofore used by the art for cellulose acetate compositions.

The compositions illustrated by the table represent clear colorless molding compositions to which coloring matter such as dyes and pigments, or fillers might be added. The clear compositions set forth were molded by the injection process in the shape of test bars, coasters, forks, spoons, etc. In this form they were readily viewed when placed before a light and in between cross nicol prisms. Viewed in this manner, the field obtained was uniformly illuminated. Only simple strain lines spaced at about 2 to 10 millimeters were noted, the molded articles showing no multi-colored granulation.

It will be understood that the details and examples hereinbefore set forth are illustrative only, and that the invention as broadly described and claimed is in no way limited thereby.

What I claim and desire to protect by Letters Patent is:

1. The method which comprises heating a composition containing as its essential ingredient cellulose acetate having a combined acetic acid content between about 56.5% and about 61% to a temperature in the range between about 380° F. and about 450° F., molding the composition under pressure while it is at the said temperature in a closed mold, cooling the composition to a substantially rigid self-supporting state, and removing the composition from the mold.

2. The method which comprises heating a composition comprising as the essential ingredient cellulose acetate having a combined acetic acid content between about 56.5% and about 61% to a temperature in the range between about 380° F. and about 450° F. in a mold, applying pressure to the composition while it is at the said temperature, cooling the composition to a substantially rigid self-supporting state, and removing the cooled composition from the mold.

3. The method which comprises heating a composition comprising as the essential ingredient cellulose acetate having a combined acetic acid content between about 56.5% and about 61% to a temperature in the range between about 380° F. and about 450° F., forcing the heated composition into a mold, cooling the composition to a substantially rigid self-supporting state, and removing the cooled composition from the mold.

4. The method which comprises heating a composition comprising cellulose acetate having a combined acetic acid content between about 56.5% and about 61% and substantially non-volatile material adapted to plasticize, toughen, and lower the softening point of the cellulose acetate, to a temperature in the range between about 380° F. and about 450° F., molding the composition under pressure while it is at the said temperature in a closed mold, cooling the composition to a substantially rigid self-supporting state, and removing the composition from the mold.

5. The method which comprises placing a composition comprising cellulose acetate having a combined acetic acid content between about 56.5% and about 61% and a substantially non-volatile material adapted to plasticize, toughen, and lower the softening point of the cellulose acetate in a mold, heating the said composition to a temperature in the range between about 380° F. and about 450° F., applying pressure to the composition while it is at the said temperature, cooling the composition to a substantially rigid self-supporting state, and removing the cooled composition from the mold.

6. The method which comprises heating a composition comprising cellulose acetate having a combined acetic acid content between about 56.5% and about 61% and substantially non-volatile material adapted to plasticize, toughen, and lower the softening point of the cellulose acetate, to a temperature in the range between about 380° F. and about 450° F., forcing the heated composition into a mold, cooling the composition to a substantially rigid self-supporting state, and removing the cooled composition from the mold.

7. The method which comprises heating a composition containing as its essential ingredient cellulose acetate having a combined acetic acid content between about 56.5% and about 61% to a temperature in the range between about 380° F. and about 450° F., molding the composition under a pressure in excess of about 200 lbs./sq. in. while it is at the said temperature in a closed mold, cooling the composition to a substantially rigid self-supporting state, and removing the composition from the mold.

8. The method which comprises heating a composition comprising as the essential ingredient cellulose acetate having a combined acetic acid content between about 56.5% and about 61% to a temperature in the range between about 380° F. and about 450° F. in a mold, applying a pressure in excess of about 200 lbs./sq. in. to the composition while it is at the said temperature, cooling the composition to a substantially rigid self-supporting state, and removing the cooled composition from the mold.

9. The method which comprises heating a composition comprising as the essential ingredient cellulose acetate having a combined acetic acid content between about 56.5% and about 61% to a temperature in the range between about 380° F. and about 450° F., forcing the heated composition at a pressure in excess of about 200 lbs./sq. in. into a mold, cooling the composition to a substantially rigid self-supporting state, and removing the cooled composition from the mold.

10. The method which comprises heating a composition comprising cellulose acetate having a combined acetic acid content between about 56.5% and about 61% and substantially non-volatile material adapted to plasticize, toughen, and lower the softening point of the cellulose acetate, to a temperature in the range between about 380° F. and about 450° F., molding the composition under a pressure in excess of about 200 lbs./sq. in. while it is at the said temperature in a closed mold, cooling the composition to a substantially rigid self-supporting state, and removing the composition from the mold.

11. The method which comprises placing a composition comprising cellulose acetate having a combined acetic acid content between about 56.5% and about 61% and a substantially non-volatile material adapted to plasticize, toughen, and lower the softening point of the cellulose acetate in a mold, heating the said composition to a temperature in the range between about 380° F. and about 450° F., applying a pressure in excess of about 200 lbs./sq. in. to the composition while it is at the said temperature, cooling the composition to a substantially rigid self-supporting state, and removing the cooled composition from the mold.

12. The method which comprises heating a composition comprising cellulose acetate having a combined acetic acid content between about 56.5% and about 61% and substantially non-volatile material adapted to plasticize, toughen, and lower the softening point of cellulose acetate, to a temperature in the range between about 380° F. and about 450° F., forcing the heated composition at a pressure in excess of about 200 lbs./sq. in. into a mold, cooling the composition to a substantially rigid self-supporting state, and removing the cooled composition from the mold.

13. The method of producing tough, hard, cellulose acetate articles resistant to moisture which consists in heating a substantially solvent-free molding composition comprising cellulose acetate having a combined acetic acid content between about 56.5% and about 61% as the essential ingredient, and plasticizer therefor, to a temperature in the range between about 380° F. and about 450° F., molding the composition under pressure while it is at the said temperature in a closed mold, cooling the composition to a substantially rigid self-supporting state, and removing the composition from the mold to obtain a molded article with a hardness of at least 20, an impact strength of at least 1.8, and a structure which in translucent sections shows uniformity of structure under crossed polarization media.

WALTER E. GLOOR.